US008136805B1

(12) United States Patent  (10) Patent No.: US 8,136,805 B1
Lee  (45) Date of Patent: Mar. 20, 2012

(54) ROW BAR HOLDER

(75) Inventor: Reginald Lee, Alameda, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 683 days.

(21) Appl. No.: 12/273,952

(22) Filed: Nov. 19, 2008

(51) Int. Cl.
*B23Q 3/18* (2006.01)
*B23Q 3/00* (2006.01)
*H04R 31/00* (2006.01)
*B28D 7/04* (2006.01)

(52) U.S. Cl. ......... 269/58; 29/603.04; 125/35; 269/292; 269/903

(58) Field of Classification Search .......... 360/129, 360/130.1, 130.2; 324/210–213; 269/58, 269/900, 903, 909, 315, 317, 291, 292, 303, 269/304, 10, 47, 49, 50; 125/35; 029/593, 029/602.1, 603.01, 603.04, 603.05, 603.07, 029/603.08, 603.09, 603.12, 603.17
See application file for complete search history.

(56) References Cited

U.S. PATENT DOCUMENTS

| 3,678,385 | A | * | 7/1972 | Bruner ............................ 29/593 |
|---|---|---|---|---|
| 5,117,589 | A |   | 6/1992 | Bischoff et al. |
| 5,718,035 | A |   | 2/1998 | Yamanaka et al. |
| 5,745,983 | A |   | 5/1998 | Quintana et al. |
| 5,821,746 | A | * | 10/1998 | Shelor ............................ 324/210 |
| 6,040,702 | A |   | 3/2000 | Hembree et al. |
| 6,261,165 | B1 |   | 7/2001 | Lackey et al. |
| 6,287,475 | B1 |   | 9/2001 | Fukushima et al. |
| 6,531,084 | B1 |   | 3/2003 | Strom et al. |
| 6,551,438 | B1 |   | 4/2003 | Tanemura |
| 6,802,115 | B2 |   | 10/2004 | Shiraishi et al. |
| 6,865,798 | B2 |   | 3/2005 | Fukuroi |
| 6,943,971 | B2 |   | 9/2005 | Kainuma et al. |
| 6,944,938 | B1 |   | 9/2005 | Crue, Jr. et al. |
| 7,049,809 | B2 |   | 5/2006 | Luo et al. |
| 7,165,462 | B2 |   | 1/2007 | Luo et al. |
| 7,928,380 | B2 | * | 4/2011 | Suga et al. .................... 250/307 |
| 2003/0005573 | A1 |   | 1/2003 | Shiraishi et al. |
| 2005/0066519 | A1 |   | 3/2005 | Borg et al. |
| 2006/0103990 | A1 |   | 5/2006 | Ito et al. |
| 2006/0130315 | A1 |   | 6/2006 | Ryuji et al. |
| 2007/0098246 | A1 |   | 5/2007 | Miyatake et al. |
| 2007/0119046 | A1 |   | 5/2007 | Seki et al. |
| 2007/0209196 | A1 | * | 9/2007 | Lau et al. .................... 29/603.07 |
| 2007/0214634 | A1 |   | 9/2007 | Yaguchi |
| 2008/0024922 | A1 |   | 1/2008 | Satoyoshi et al. |

\* cited by examiner

*Primary Examiner* — Hadi Shakeri

(57) ABSTRACT

A row bar holder to hold a plurality of row bars containing reader heads for scanning operations is disclosed. The row bar holder includes: a base fixture having a length defining a y-axis and a width defining an x-axis, a plurality of separator walls formed on a top surface of the base fixture spaced from one another to separate the plurality of row bars containing reader heads, a plurality of grooves defined between the adjacent separator walls to receive the row bars, respectively, and a draw bar mountable within the base fixture, the draw bar having a plurality of draw bar walls that approximately align with the plurality of separator walls of the base fixture along the y-axis.

20 Claims, 6 Drawing Sheets

ROW BAR HOLDER

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable head for reading and writing data. Hard disk drives have become familiar information storage devices that use a disk to store data and a moveable head to selectively read data from and write data to the disk.

Today, methods for manufacturing reader heads typically include techniques such as: (1) cutting a wafer into a plurality of row bars; (2) placing the row bars into a row bar holder for in situ inspection by a scanning electron microscope (SEM); and (3) after inspection, cutting the row bars into reader heads that are then utilized in the manufacturing of read/write heads for disk drives.

However, presently, when the row bars are placed into the grooves of a row bar holder by an operator (for example, by the operator placing them into the grooves with tweezers), they are not held in the groove in a fixed manner. Because of this, the row bars move in both the x and y direction in the grooves of the row bar holder and each row bar in each groove is located at a relatively different location relative to one another. Accordingly, the current design of the row bar holder results in considerable uncertainty in row bar positions in the grooves of the row bar holder in terms of both the row bar holder length (e.g., the y-axis) and the row bar holder width (e.g., the x-axis).

Because of this, when a scanning electron microscope (SEM) is utilized to test the reader heads of the row bars, additional steps must be taken by the testing system to determine the position of each row bar relative to each groove. This extra testing step may amount to approximately 10-15 seconds of lost time per row bar. This is because the scanning electron microscope has to constantly re-calibrate in order to perform the scanning of the row bars.

A need therefore exists for an improved row bar holder that constrains row bars along both the x-axis and y-axis such that scanning operations for the reader heads performed by a scanning electron microscope (SEM) can be employed in a much more efficient fashion.

DETAILED DESCRIPTION

In the following description, various embodiments of the invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known mechanical structures, mechanical devices, mechanical mounting and spring devices, electrical structures, circuits, manufacturing devices, methods, procedures, and components are not described in detail, or are shown in block diagram or reduced form, in order not to obscure the present invention.

Figure 1:
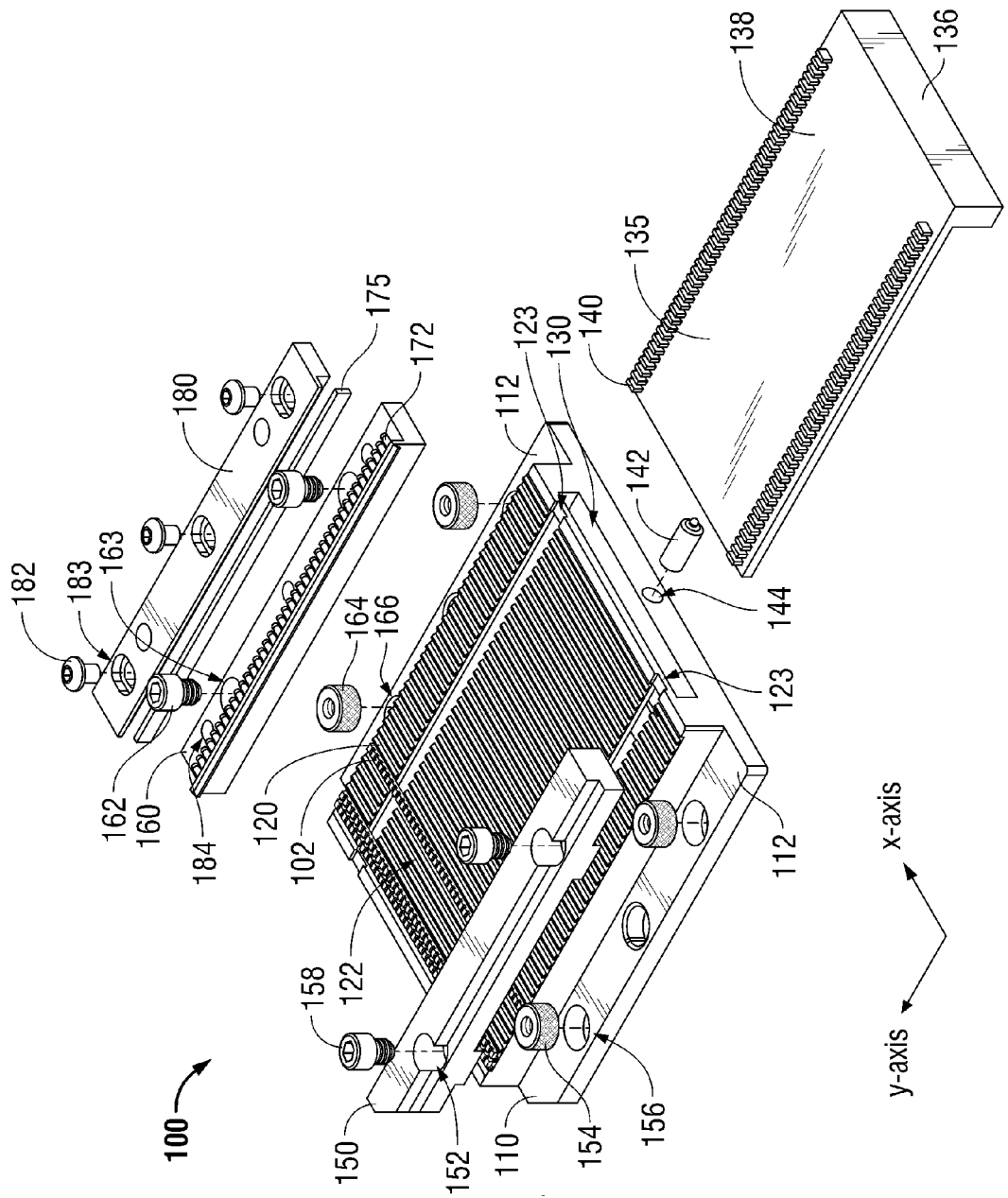
FIG. 1 is an exploded perspective view of the components of a row bar holder, according to one embodiment of the invention.
Figure 2:
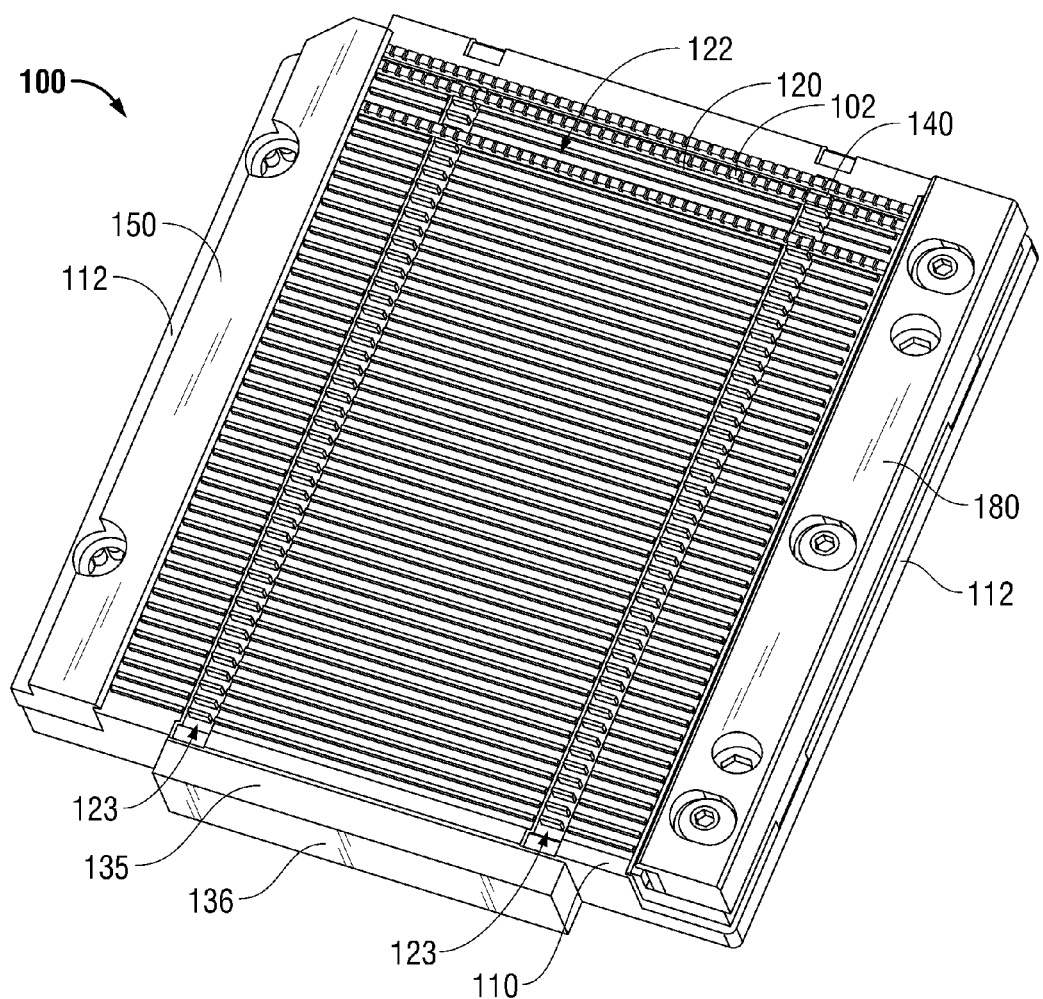
FIG. 2 is a top perspective view of an assembled row bar holder, according to one embodiment of the invention.

With reference to FIGS. 1 and 2, a row bar holder 100, according to one embodiment of the invention will be hereinafter described. Row bar holder 100 may be utilized to hold a plurality of row bars 102 containing reader heads for scanning operations by a scanning electron microscope (SEM) for in situ inspection of the reader heads before disk drive head creation.

Row bar holder 100 includes a base fixture 110 having a length defining a y-axis and a width defining an x-axis. Base fixture 110 may be approximately channel-shaped having a pair of opposed flanges 112. Base fixture 110 may further include a plurality of separator walls 120 formed on the top surface of the base fixture that are spaced from one another to separate the plurality of row bars 102 containing reader heads. A plurality of grooves 122 are defined between adjacent separator walls 120 that are formed to receive the row bars 102, respectively. The top surface of base fixture 110 may include a pair of aligned channels 123 that form breaks in the separator walls 120 for the receipt of draw bar walls from the draw bar, as will be described.

Base fixture 110 may include a rectangular-shaped opening 130 within the base fixture itself having sufficient length and width to receive a draw bar 135. Draw bar 135 is approximately L-shaped having a push section 136 and a drawbar wall section 138 that includes a plurality of draw bar walls 140 protruding perpendicularly therefrom.

As can be seen particularly in FIG. 2, draw bar 135 may be mounted within base fixture 110, and when mounted therein, the plurality of draw bar walls 140 are received within aligned channels 123 and approximately align with the plurality of separator walls 120 of base fixture 110 along the y-axis.

Figure 3:
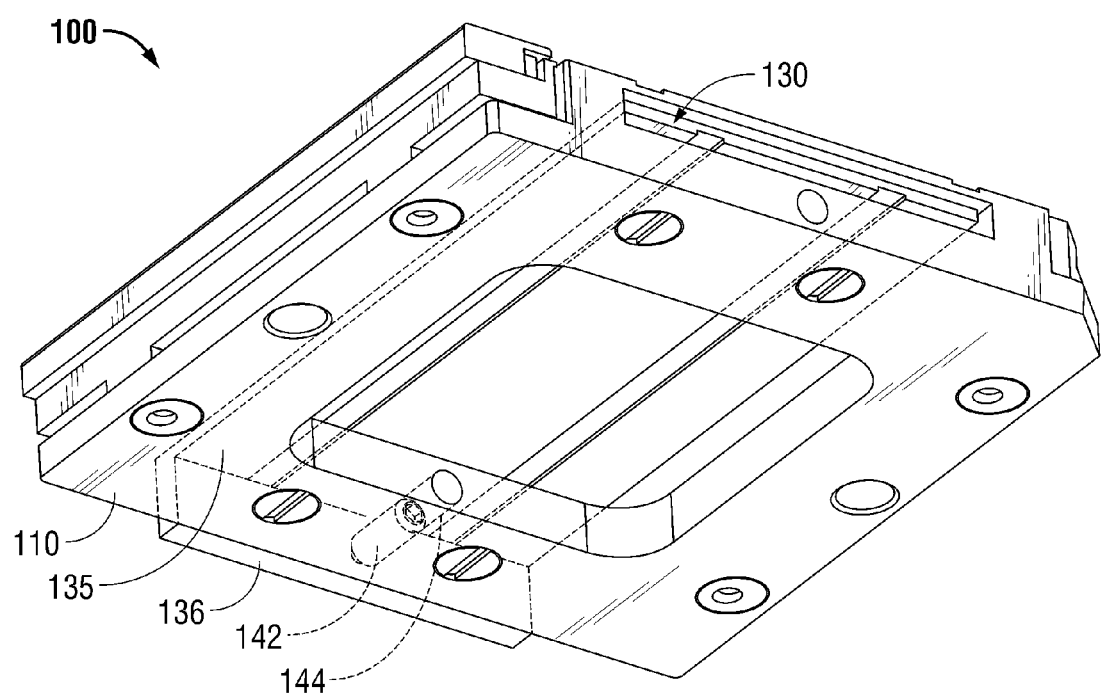
FIG. 3 is a bottom perspective view of the row bar holder illustrating the draw bar (shown in dashed lines) mounted within the base fixture, according to one embodiment of the invention.

Referring also to FIG. 3, a spring mechanism 142 may be mounted between draw bar 135 and base fixture 110. In one embodiment, spring mechanism 142 may be mounted between the push section 136 of draw bar 135 and base fixture 110 by being mounted within a circular hole 144 of base fixture 110. FIG. 3 shows the draw bar 135, circular hole 144, and spring mechanism 142 in dashed lines as being mounted within base fixture 110.

In one embodiment, spring mechanism 142 may be a spring plunger. Spring plunger 142 may include external threads which mate with internal threads of the circular hole 144 of base fixture 110 to mount spring plunger 142 to base fixture 110. It should be appreciated that a wide variety of spring mechanisms other than a spring plunger may be utilized and that a wide variety of mechanisms to mount the spring mechanism to the base fixture may be utilized, as would be well known to those of skill in the art.

As will be described in more detail later, when draw bar 135 is compressed within base fixture 110, spring plunger 142 is loaded such that draw bar 135 is spring-loaded relative to base fixture 110. When draw bar 135 is decompressed, for example, by pushing push section 136, spring plunger 142 is unloaded such that draw bar 135 is pushed back and the draw bar walls 140 move the plurality of row bars 102 against the separator walls 120 of base fixture 110.

Further, an approximately rectangular-shaped hard stop 150 may be mounted to flange 112 on a first side of base fixture 110. Hard stop 150 may include a pair of holes 152 that align with threaded inserts 154 mounted within holes 156 of flange 112 of base fixture 110 in order to receive screws 158 to mount hard stop 150 to base fixture 110.

An approximately L-shaped push mechanism 160 may be mounted to flange 112 on a second side of base fixture 110. Push mechanism 160 may be mounted by screws 162 through holes 163 of push mechanism 160 to threaded inserts 164 mounted into holes 166 of flange 112. Push mechanism 160 may include a plurality of push pins 172.

Further, a push pin bumper 175 may be mounted against the plurality of push pins 172 by a clamp cover 180 that is mounted by screws 182 through holes 183 of the clamp cover 180 to screw holes 184 of the push mechanism 160.

As will be described in more detail later, push mechanism 160 pushes the plurality of row bars 102 along the x-axis against hard stop 150. More particularly, push pins 172 push against the plurality of row bars 102, respectively, because push pin bumper 175 is mounted against the plurality of push pins 172 and provides a spring force against the plurality of push pins 172.

Figure 4:
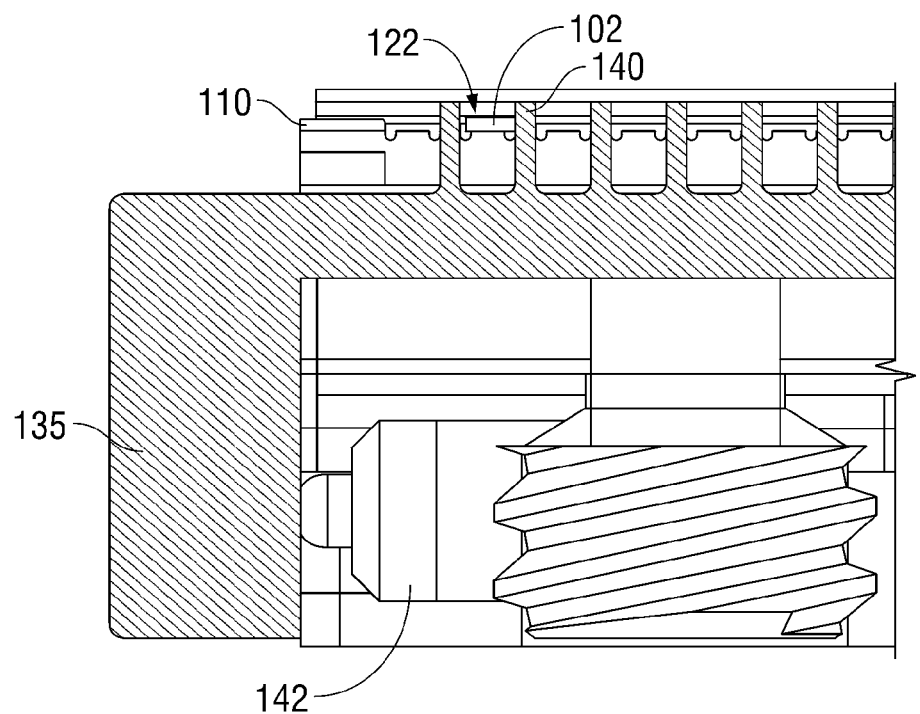
FIG. 4 is a partial sectional view of the row bar holder illustrating the draw bar mounted within the base fixture in a compressed state, according to one embodiment of the invention.

With reference to FIG. 4, spring plunger 142 is shown in a compressed state within base fixture 110. In particular, spring plunger 142 is in a loaded state such that draw bar 135 is spring-loaded relative to base fixture 110. By depressing draw bar 135 against spring plunger 142, draw bar 135 is preloaded. As can be seen, in this state, the draw bar walls 140 are spring loaded relative to the row bars 102 residing in the grooves 122.

Figure 5:
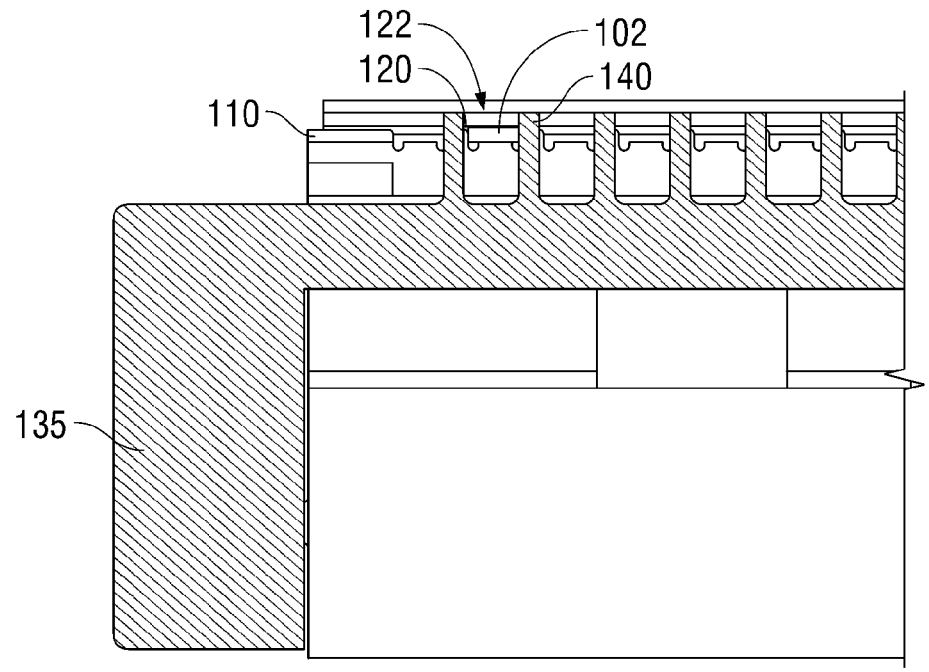
FIG. 5 is a partial sectional view of the row bar holder illustrating a row bar being moved against the separator walls of the base fixture when the draw bar is in a decompressed state, according to one embodiment of the invention.

Turning now to FIG. 5, when the draw bar is decompressed, spring plunger 142 is unloaded such that the draw bar walls 140 move the plurality of row bars 102 in grooves 122 against the separator walls 120 of base fixture 110. In this way, the plurality of row bars 102 are secured along the y-axis against the separator walls 120 of base fixture 110 such that they are at fixed locations.

Figure 6:
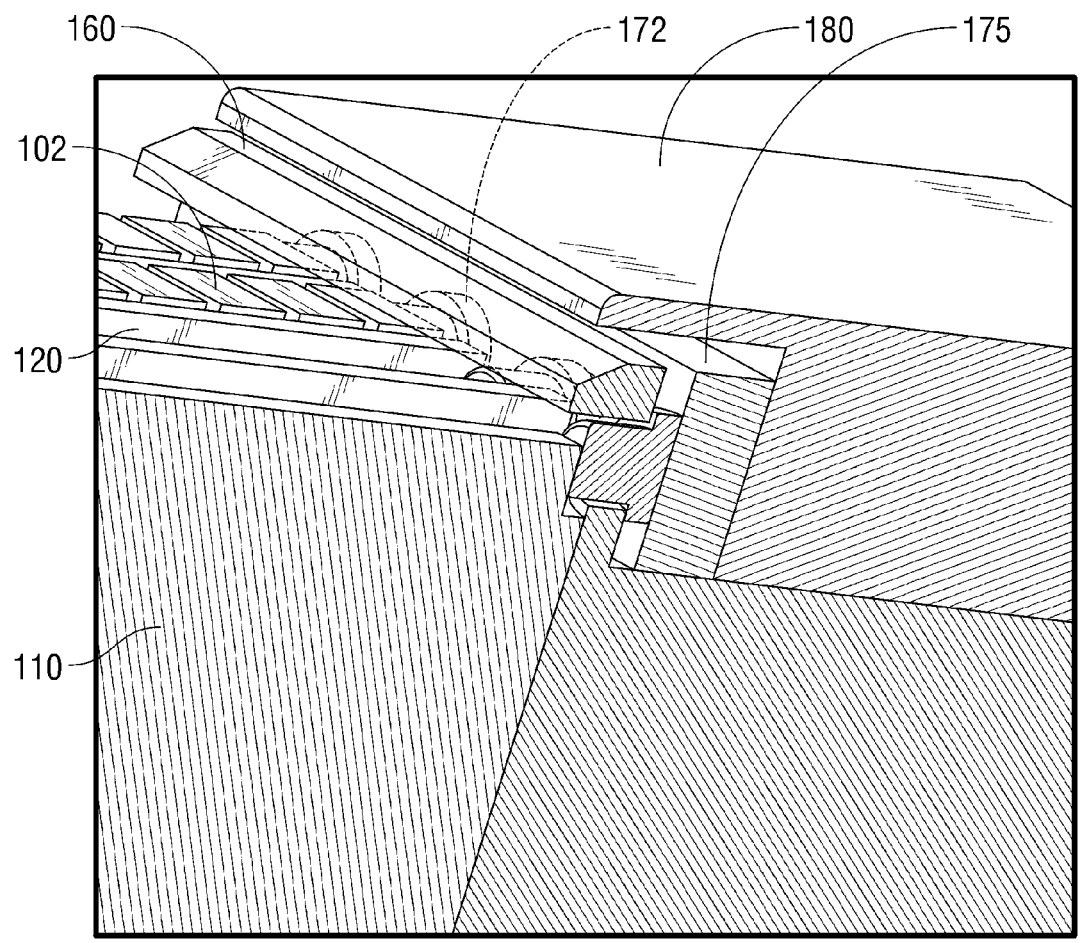
FIG. 6 is a partial perspective sectional view of the row bar holder illustrating the push mechanism pushing against the plurality of row bars, according to one embodiment of the invention.
Figure 7:
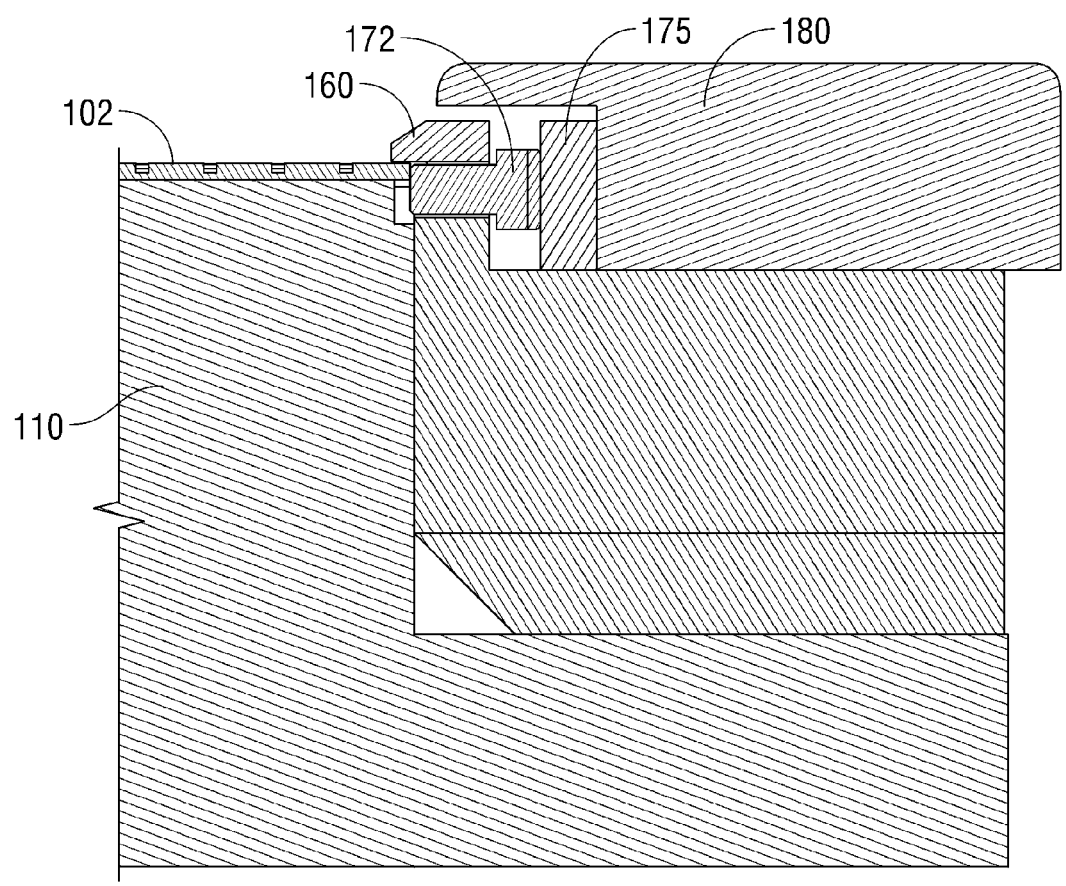
FIG. 7 is a cross-sectional view of the row bar holder illustrating a push pin pushing against a row bar, according to one embodiment of the invention.

Turning now to FIGS. 6 and 7, push mechanism 160 may include a plurality of push pins 172 that push against a plurality of row bars 102, respectively, in which, push pin bumper 175 may be mounted against the plurality of push pins 172 to provide a spring force against the plurality of push pins. In this way, the push pins 172 by receiving a spring force from push pin bumper 175 push the plurality of row bars 102 along the x-axis against the hard stop 150.

By utilizing the spring force of push pin bumper 175 against the plurality of push pins 172, slight movement against push pin bumper 175 allows for the individual variant of each row bar's overall length to be compensated for as the write clamp assembly 180 is brought snug into position. Further, in this way, the row bars are pushed along the x-axis against the hard stop such that they are in a fixed position along the x-axis.

By utilizing the above-described structure of row bar holder 100, the variability of the reader heads site-to-site location within the row bars are minimized when performing scanning by the scanning electron microscope (SEM) during testing. The above-described row bar holder 100 structure incorporates two axes of compliance for row bars 120 while they undergo in situ testing by a scanning electron microscope.

In particular, the x-axis constrains and registers row bars 102 by using the previously-described compliant push pins 172 against the hard stop and the y-axis constrains and registers row bars 102 using the previously-described spring loaded draw bar 135.

Because the above-described row bar holder 100 provides compliant constraining of the row bars along the x-axis and y-axis, this significantly reduces the amount of time required to perform testing by the scanning electron microscope (SEM) because additional steps to determine the position of each row bar are significantly reduced. Thus, throughput is significantly enhanced.

Further, by eliminating the additional position determination steps exposure of the row bars to the electron current of the scanning electron microscope (SEM) is reduced, thus reducing the risk of device contamination.

It should be appreciated by those with skill in this art that, although embodiments of the invention have been previously described with reference to particular mechanical components, structures, mounting devices, etc., for the row bar holder, that the embodiments of the invention may be utilized with a wide variety of differing types of mechanical components, structures, and mounting devices, and that the details disclosed in describing the embodiments of the invention are not intended to limit the scope of the invention as set forth in the appended claims.

What is claimed is:

1. A row bar holder to hold a plurality of row bars containing reader heads for scanning operations comprising:
   a base fixture having a length defining a y-axis and a width defining an x-axis;
   a plurality of separator walls formed on a top surface of the base fixture spaced from one another to separate the plurality of row bars containing reader heads;
   a plurality of grooves defined between the adjacent separator walls to receive the row bars respectively;
   a draw bar mountable within the base fixture, the draw bar having a plurality of draw bar walls that approximately align with the plurality of separator walls of the base fixture along the y-axis, and
   a spring mechanism mounted between the draw bar and the base fixture.

2. The row bar holder of claim 1, wherein, when the draw bar is compressed within the base fixture, the spring mechanism is loaded such that the draw bar is spring-loaded relative to the base fixture.

3. The row bar holder of claim 2, wherein, when the draw bar is decompressed, the spring mechanism is unloaded such that the draw bar walls move the plurality of row bars against the separator walls of the base fixture.

4. The row bar holder of claim 1, wherein, the spring mechanism is a spring plunger.

5. The row bar holder of claim 1, further comprising a hard stop mounted to a first side of the base fixture and a push mechanism mounted to a second side of the base fixture, wherein the push mechanism pushes the plurality of row bars along the x-axis against the hard stop.

6. The row bar holder of claim 5, wherein the push mechanism includes a plurality of push pins to push against the plurality of row bars, respectively, and a push pin bumper mounted against the plurality of push pins.

7. The row bar holder of claim 6, wherein the push pin bumper provides a spring force against the plurality of push pins.

8. A method of holding a plurality of row bars containing reader heads for scanning operations comprising:
    providing a base fixture having a length defining a y-axis and a width defining an x-axis, the base fixture including a plurality of separator walls formed on a top surface of the base fixture spaced from one another;
    mounting a draw bar within the base fixture, the draw bar having a plurality of draw bar walls that approximately align with the plurality of separator walls of the base fixture along the y-axis; and
    mounting the plurality of row bars containing reader heads in a plurality of grooves defined between the adjacent separator walls and between the draw bar walls, respectively,
    wherein the draw bar includes a spring mechanism.

9. The method of claim 8, further comprising compressing the draw bar within the base fixture such that the spring mechanism is loaded and the draw bar is spring-loaded relative to the base fixture.

10. The method of claim 9, further comprising decompressing the draw bar such that the spring mechanism is unloaded and the draw bar walls move the plurality of row bars against the separator walls of the base fixture.

11. The method of claim 8, wherein the spring mechanism is a spring plunger.

12. The method of claim 8, further comprising:
    mounting a hard stop to a first side of the base fixture; and
    mounting a push mechanism to a second side of the base fixture, wherein the push mechanism pushes the plurality of row bars along the x-axis against the hard stop.

13. The method of claim 12, wherein the push mechanism includes a plurality of push pins to push against the plurality of row bars, respectively, and a push pin bumper mounted against the plurality of push pins.

14. The method of claim 13, wherein the push pin bumper provides a spring force against the plurality of push pins.

15. A row bar holder to hold a plurality of row bars containing reader heads for scanning operations comprising:
    a base fixture having a length defining a y-axis and a width defining an x-axis;
    a plurality of separator walls formed on a top surface of the base fixture spaced from one another to separate the plurality of row bars containing reader heads;
    a plurality of grooves defined between the adjacent separator walls to receive the row bars respectively;
    a draw bar mountable within the base fixture, the draw bar having a plurality of draw bar walls that approximately align with the plurality of separator walls of the base fixture along the y-axis; and
    a spring mechanism mounted between the draw bar and the base fixture, wherein, when the draw bar is compressed within the base fixture, the spring mechanism is loaded such that the draw bar is spring-loaded relative to the base fixture.

16. The row bar holder of claim 15, wherein, when the draw bar is decompressed, the spring mechanism is unloaded such that the draw bar walls move the plurality of row bars against the separator walls of the base fixture.

17. The row bar holder of claim 15, wherein, the spring mechanism is a spring plunger.

18. The row bar holder of claim 15, further comprising a hard stop mounted to a first side of the base fixture and a push mechanism mounted to a second side of the base fixture, wherein the push mechanism pushes the plurality of row bars along the x-axis against the hard stop.

19. The row bar holder of claim 18, wherein the push mechanism includes a plurality of push pins to push against the plurality of row bars, respectively, and a push pin bumper mounted against the plurality of push pins.

20. The row bar holder of claim 19, wherein the push pin bumper provides a spring force against the plurality of push pins.

* * * * *